United States Patent [19]

Sauer

[11] 4,070,781
[45] Jan. 31, 1978

[54] WINDOWS BEARING AN INSCRIPTION

[75] Inventor: Gerd Sauer, Aachen-Laurensberg, Germany

[73] Assignee: Saint-Gobain Industries, Neuilly-sur-Seine, France

[21] Appl. No.: 739,096

[22] Filed: Nov. 5, 1976

[30] Foreign Application Priority Data

Nov. 13, 1975   France .............................. 75 34573

[51] Int. Cl.² .................................................. G09F 13/12
[52] U.S. Cl. ........................................ 40/219; 40/591
[58] Field of Search .................. 40/219, 135, 125 F, 40/130 B, 129 C, 125 R; 350/291; 428/207, 210; 52/171

[56] References Cited

U.S. PATENT DOCUMENTS

| | | | |
|---|---|---|---|
| 999,112 | 7/1911 | Kloster | 428/207 |
| 1,202,593 | 10/1916 | Scott | 40/219 |
| 2,114,711 | 4/1938 | Horinstein | 40/219 |

Primary Examiner—Russell R. Kinsey
Assistant Examiner—Wenceslao J. Contreras
Attorney, Agent, or Firm—Pennie & Edmonds

[57] ABSTRACT

A window glass having an inscription thereon formed from a semi-reflective transparent material. The inscription is visible when it is viewed against a dark background and does not interfere with vision through the glass when viewed against a light background.

9 Claims, 1 Drawing Figure

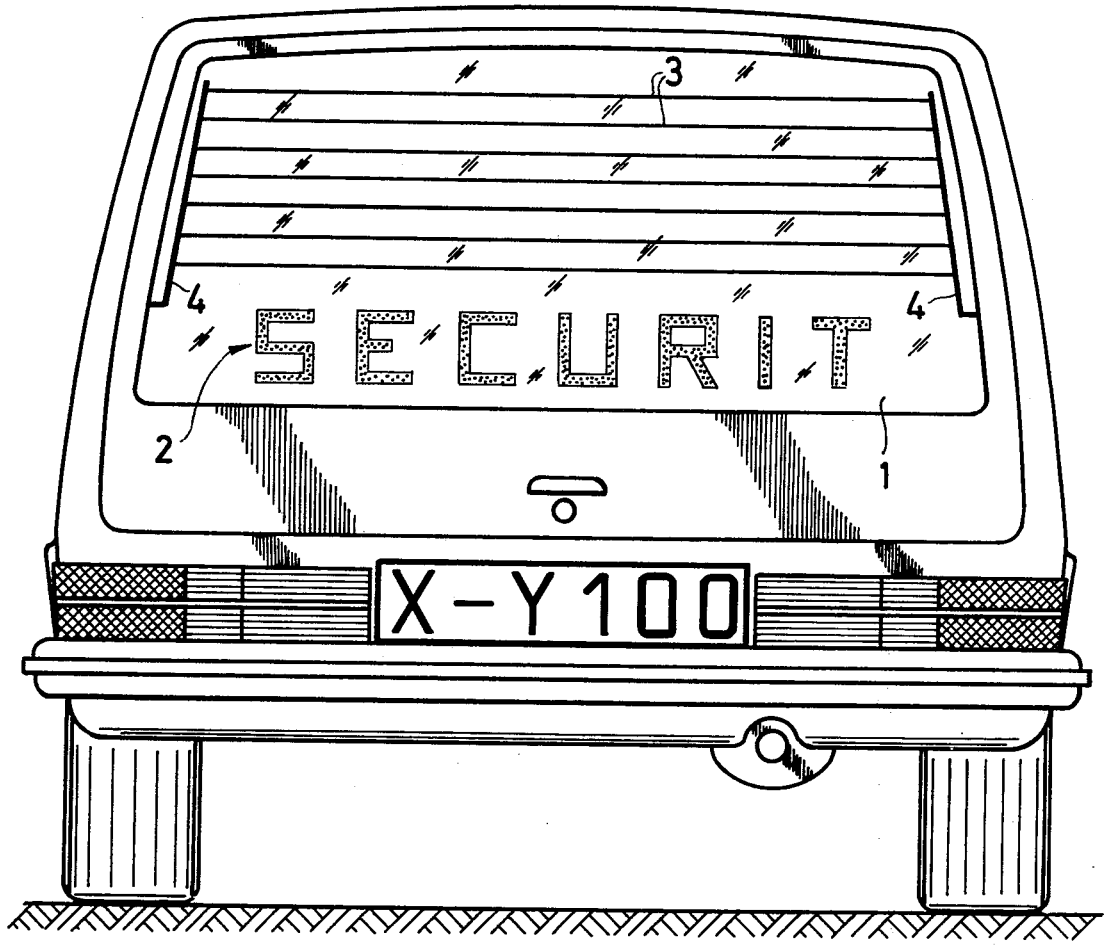

WINDOWS BEARING AN INSCRIPTION

BACKGROUND OF THE INVENTION

The present invention relates to windows bearing an inscription in the form of a drawing or writing. Windows are generally designed for maximum light transmission; and this applies especially to vehicle windows which are governed by regulations specifying the minimum permissible light transmission.

With particular reference to vehicle windows, it may be desirable to add an inscription containing advertising material. Also, recently there has been a trend toward applying decorative inscriptions on vehicle windows. In many localities, however, regulations prohibit or limit the size of such inscriptions. This is generally so in view of the fact that the application of inscriptions on windows using conventional materials unacceptably reduces the transparency of the windows or does not allow acceptable visibility through the same. Excessive reduction in visibility results, for example, if the inscriptions are intended to be visible from long distances. In such a situation, the inscriptions would have to be large and would therefore take up a considerable surface area of the window.

SUMMARY OF THE PRESENT INVENTION

According to the teachings of the present invention, it is possible to very adequately satisfy the two apparently contradictory requirements of long range visibility of the inscriptions and good visibility through the windows. This result is achieved by applying the inscriptions as a semi-reflecting transparent layer to the surface of the glass forming the window. The inscription produced according to the invention is characterized in that by virtue of its increased reflective capacity, it is clearly visible against the darker background space of the vehicle interior; but when observed on the light background outside of the vehicle, it is, at best, only slightly visible owing to its transparency. Consequently, it does not obstruct vision of the occupants of the vehicle.

It is generally known that semi-transparent layers observed on a light background permit good vision whereas when observed on a dark background they act as an opaque mirror. The two-way mirrors is an example. The present invention employs the same type of coating as used with two-way mirrors to form the inscription; and under normal conditions of use, i.e., in the case of vehicle windows or windows of buildings, the effect is so pronounced that the inscriptions can be clearly read from outside the enclosed space and even at a great distance.

If, for example, an inscription covering a large surface area is applied according to the invention to the rear window of an automobile, the driver looking outside through the rear window by means of his rearview mirror with his eyes accustomed to the outside light hardly notices or does not notice at all the inscription formed by the semi-reflecting layer. On the other hand, this same inscription is very apparent to the person looking from the outside towards the darker background constituted by the inside space of the vehicle such that he can clearly read the inscription.

BRIEF DESCRIPTION OF THE DRAWING

The single FIGURE of the drawing is a view showing the rear window of a vehicle incorporating an inscription applied in accordance with the teachings of the present invention.

DETAILED DESCRIPTION OF THE PREFERRED EMBODIMENT

As shown in the drawing, the rear window glass 1 of the vehicle bears an inscription 2. This inscription which is formed according to the invention on the lower part of the glass can represent any technical information or consist merely of a trademark, advertisement, design or decorative drawing.

The desired reflective and transparent effect is especially evident when the layer forming the inscriptions 2 and the underlying regions of the glass 1 possess an average transmission of 50-90% and a corresponding reflective capacity of 10-50% for the visible light wavelength range under conditions of perpendicular illumination. In these regions the average transmission will preferably be 60-80% and the corresponding reflective capacity 20-40%. Materials suitable for forming the semi-reflective layers are presently available. Such materials are applied in the form of metal layers, metal oxide layers, or semi-conductive layers. When it is desired to use metal layers which are generally sensitive to wear and possible to the effects of weather, it is necessary to protect them with a suitable coating. Conventional protective agents can be used for this purpose.

Reflective capacities in excess of 30% are generally only available with metal layers. However, metal oxide layers or semi-conductive layers are suitable for use when it is wished to produce reflecting layers having a reflective capacity lower than 30%. The metal oxide or semi-conductive layers of this type can consist, for example, of tin oxide layers, indium oxide, bismuth oxide, titanium oxide or zinc sulfide layers.

It is particularly advantageous to form the layer constituting the inscription by means of a metal oxide deposit which is annealed on the surface of the glass. When the metal oxide layers have been annealed, they do not require a further protective layer. They can be annealed during the thermal tempering operation or during the tempering and curving operation in the case of curved windows such that, apart from the printing stage, no additional step is required.

An example of material suitable for the present invention is the iridescent layer-forming product sold commercially by DEGUSSA under the name "Luesterfarbe Silberiris" (PS-NR 789 000 23). This material is conventionally used to decorate porcelain, glass and ceramics. This material can be deposited by means of the silk screen process onto the surface of the window glass facing towards the inside of the vehicle. It is a varnish-type of liquid containing dissolved metals as its essential constituents. After the varnish has been applied, it is allowed to dry. In the course of the thermal tempering operation in which the sheet of glass is brought to a temperature of approximately 650°, the varnish is annealed onto the surface of the glass and forms a very fine and durable metal oxide layer whose thickness can hardly be measured.

If, for example, the product "Luesterfarbe Silberiris" is applied by the silk screen process using a silk fabric containing 165 openings per centimeter, the glass and overlying layer which is obtained after annealing has an average light transmission of about 73% in the visible range of the spectrum in the case of perpendicular illumination and a reflective capacity of about 25%.

This inscription forms a clearly visible and regular image through reflection from outside of the vehicle whereas it is hardly visible from the inside of the vehicle owing to the high level of transmission.

The rear window glass 1 shown in the drawing also bears heating conductors 2 annealed on the surface of the glass and connected by wires 4 to an electrical circuit. In this case, it is especially advantageous to anneal the heating conductors and the inscription 2 in the single thermal operation which is used to curve and/or temper the sheet of glass such that to produce the inscription, the only additional operation required is the silk screen deposition process.

The above-described process can also be used for tempered items other than vehicle windows such as doors or other glass articles.

I claim:

1. In a window glass extending across a window into an interior space having a lower brightness level than outside said space, said glass comprising the sole means extending across the window for closing it and having an inscription thereon, the improvement where the inscription comprises:
    a. a semi-reflective, transparent layer applied to the surface of said glass.

2. In a window glass according to claim 1, the improvement wherein:
    a. the area of the glass covered by the semi-reflective transparent layer possesses an average light transmission of between about 50–90% and a corresponding light reflective capacity of between about 10–50% in the visible wave-length range as measured under conditions of perpendicular illumination.

3. In a window glass according to claim 2, the improvement wherein:
    a. the average light transmission of the glass covered by said layer is between about 60–80%; and
    b. the corresponding reflective capacity of said layer is between about 20–40%.

4. In a window glass according to claim 2, the improvement wherein:
    a. the layer forming said inscription is essentially a metal, metal oxide or semi-conductive layer.

5. In a window glass according to claim 4, the improvement wherein:
    a. the layer forming said inscription is an annealed construction.

6. In a window glass according to claim 2, the improvement wherein:
    a. the layer forming said inscription is essentially a metal oxide or semi-conductive material selected from the group consisting of tin oxide, indium oxide, bismuth oxide, titanium oxide and zinc sulfide.

7. In a window glass according to claim 6, the improvement wherein:
    a. the layer forming said inscription is an annealed construction.

8. In a window glass according to claim 7, the improvement wherein:
    a. the layer forming said inscription is applied to the surface of the glass facing said interior space.

9. In a window glass according to claim 8, the improvement wherein:
    a. the material for the layer forming said inscription is a varnish-type enamel containing dissolved metals; and
    b. the enamel is annealed to the surface of the glass as a metal oxide.